(12) United States Patent
Rao et al.

(10) Patent No.: US 12,254,149 B2
(45) Date of Patent: Mar. 18, 2025

(54) TOUCH DISPLAY PANEL AND MANUFACTURING METHOD THEREFOR, AND DISPLAY APPARATUS

(71) Applicants: Hefei Visionox Technology Co., Ltd., Anhui (CN); KunShan Go-Visionox Opto-Electronics Co., Ltd., Jiangsu (CN)

(72) Inventors: Bo Rao, Hefei (CN); Xiaoxi Sun, Hefei (CN); Yuan Yao, Hefei (CN); Liusong Ni, Hefei (CN); Mingxing Liu, Hefei (CN)

(73) Assignees: Hefei Visionox Technology Co., Ltd., Hefei (CN); KunShan Go—Visionox Opto-Electronics Co., Ltd., KunShan (CN)

( * ) Notice: Subject to any disclaimer, the term of this patent is extended or adjusted under 35 U.S.C. 154(b) by 0 days.

(21) Appl. No.: 18/733,289

(22) Filed: Jun. 4, 2024

(65) Prior Publication Data

US 2024/0319813 A1 Sep. 26, 2024

(30) Foreign Application Priority Data

Jan. 2, 2024 (CN) .......................... 202410008508.X

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 3/0446* (2019.05);
(Continued)

(58) Field of Classification Search
CPC .... G06F 3/0412; G06F 3/0443; G06F 3/0446; G06F 2203/04103; G06F 2203/04111; G06F 2203/04112
See application file for complete search history.

(56) References Cited

U.S. PATENT DOCUMENTS

2019/0273124 A1* 9/2019 Leng ..................... H10K 77/111
2020/0310586 A1* 10/2020 Ding ..................... H10K 50/84
(Continued)

FOREIGN PATENT DOCUMENTS

| CN | 108762571 B | 10/2021 |
| CN | 111312072 B | 1/2022 |

(Continued)

*Primary Examiner* — Andrew Sasinowski
(74) *Attorney, Agent, or Firm* — Rimon PC

(57) ABSTRACT

Disclosed are a touch display panel and a manufacturing method therefor, and a display apparatus. A problem of high cost and a thick thickness of a touch display apparatus is solved. The touch display panel includes: a substrate; an isolation structure layer with a plurality of isolation openings; a plurality of light-emitting devices located in the isolation openings, the light-emitting device including a first electrode facing the substrate; and a touch electrode including a first touch electrode and a second touch electrode. The second touch electrode includes a plurality of main body portions and a plurality of bridge portions disposed in different layers. The first touch electrode, the plurality of main body portions and the first electrode are disposed in a same layer; or the first touch electrode, the plurality of main body portions and the isolation structure layer are disposed in a same layer.

20 Claims, 13 Drawing Sheets

(52) U.S. Cl.
CPC .............. *G06F 2203/04103* (2013.01); *G06F 2203/04111* (2013.01)

(56) References Cited

U.S. PATENT DOCUMENTS

| | | | | |
|---|---|---|---|---|
| 2021/0096669 A1* | 4/2021 | Zhang | ................... | G06F 3/044 |
| 2021/0200378 A1* | 7/2021 | Wu | ................... | G06F 3/0443 |
| 2022/0057910 A1* | 2/2022 | Xiong | ................... | H05K 1/147 |

FOREIGN PATENT DOCUMENTS

| | | |
|---|---|---|
| CN | 114115575 A | 3/2022 |
| CN | 112270895 B | 11/2022 |

\* cited by examiner

Synchronously preparing a plurality of first electrodes, a first touch electrode and a plurality of main body portions on a substrate, where the first touch electrode and the main body portion are both located between adjacent first electrodes — S1110

Synchronously preparing an isolation structure layer and a bridge portion on the substrate, where an orthographic projection of the isolation structure layer on the substrate covers an orthographic projection of the first touch electrode and orthographic projections of the plurality of main body portions on the substrate respectively, a plurality of isolation openings are formed in the isolation structure layer, and the isolation opening exposes at least a part of the first electrode — S1120

Sequentially preparing a light-emitting layer and a second electrode in the isolation opening to obtain the touch display panel — S1130

Preparing an organic encapsulation layer on a side, facing away from the substrate, of the second electrode, where the organic encapsulation layer fills an interval area between the isolation structure layer and the bridge portion, and an orthographic projection of the organic encapsulation layer on the substrate covers orthographic projections of the second electrode, the isolation structure layer, and the bridge portion on the substrate — S1140

FIG. 11

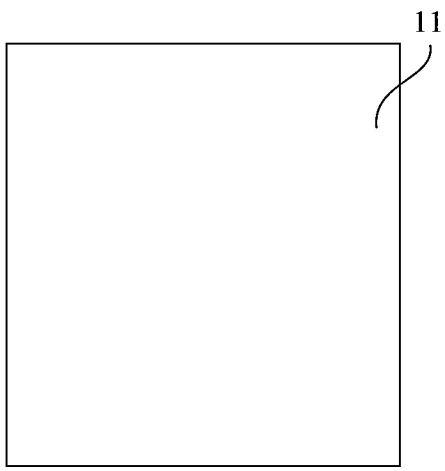

FIG. 12a

TOUCH DISPLAY PANEL AND MANUFACTURING METHOD THEREFOR, AND DISPLAY APPARATUS

CROSS-REFERENCE TO RELATED APPLICATIONS

This application claims priority to Chinese Patent Application No. 202410008508.X, filed on Jan. 2, 2024, which is hereby incorporated by reference in its entirety.

TECHNICAL FIELD

Embodiments of the present disclosure relate to the field of display technologies, and in particular, to a touch display panel and a manufacturing method therefor, and a display apparatus.

BACKGROUND

An intelligent display apparatus is usually equipped with a touch function. However, production cost of the intelligent display apparatus equipped with the touch function is relatively high. Meanwhile, a thickness of the product is relatively thick, which is not conducive to thinning of the product.

SUMMARY

In view of this, embodiments of the present disclosure provide a touch display panel and a manufacturing method therefor, and a display apparatus, so as to solve a problem of high cost and a thick thickness of a touch display apparatus.

A first aspect of the present disclosure provides a touch display panel, including: a substrate; an isolation structure layer, located on a side of the substrate, where a plurality of isolation openings are formed in the isolation structure layer; a plurality of light-emitting devices, located in the isolation openings and including a first electrode facing the substrate; and a touch electrode, including a first touch electrode and a second touch electrode, the second touch electrode including a plurality of main body portions and a plurality of bridge portions disposed in different layers from the main body portions, one of the bridge portions being connected to an adjacent one of the main body portions by a through hole, and an orthographic projection of at least one of the bridge portions on the substrate intersecting with an orthographic projection of the first touch electrode on the substrate; where the first touch electrode, the plurality of main body portions and the first electrode are disposed in a same layer; or the first touch electrode, the plurality of main body portions and the isolation structure layer are disposed in a same layer.

A second aspect of the present disclosure provides a touch display panel, including: a substrate, where the substrate includes at least one conductive layer; an isolation structure layer, located on a side of the substrate, where a plurality of isolation openings are formed in the isolation structure layer; a plurality of light-emitting devices, located in the isolation openings and including a first electrode facing the substrate; and a touch electrode, including a first touch electrode and a second touch electrode, the second touch electrode including a plurality of main body portions and a plurality of bridge portions; where the first touch electrode, the plurality of main body portions and the first electrode are disposed in a same layer; or, the first touch electrode, the plurality of main body portions and the isolation structure layer are disposed in a same layer, the bridge portion is located in any conductive layer, the bridge portion is connected to an adjacent one of the main body portions by a through hole, and an orthographic projection of the bridge portion on the substrate intersects with an orthographic projection of the first touch electrode on the substrate.

A third aspect of the present disclosure provides a manufacturing method for a touch display panel, including: synchronously preparing a plurality of first electrodes, a first touch electrode and a plurality of main body portions on a substrate, where the first touch electrode and the main body portions are located between adjacent first electrodes; preparing an isolation structure layer and a bridge portion on the substrate, where an orthographic projection of the isolation structure layer on the substrate covers an orthographic projection of the first touch electrode and orthographic projections of the main body portions on the substrate respectively, a plurality of isolation openings are formed in the isolation structure layer, and the isolation opening exposes at least a part of the first electrode; a part of the isolation structure layer includes a through hole, the bridge portion is located in the through hole and spaced apart from the isolation structure layer, two ends of the bridge portion are electrically connected to adjacent one of the main body portions respectively, and an orthographic projection of the bridge portion on the substrate intersects with the orthographic projection of the first touch electrode on the substrate; and sequentially preparing a light-emitting layer and a second electrode in the isolation opening to obtain the touch display panel.

A fourth aspect of the present disclosure provides a manufacturing method for a touch display panel, including: synchronously preparing a plurality of first electrodes and a bridge portion on a substrate, where the bridge portion is located between adjacent first electrodes; preparing an isolation structure layer, a first touch electrode and a plurality of main body portions on the substrate, where an orthographic projection of the isolation structure layer on the substrate covers an orthographic projection of the bridge portion on the substrate, a plurality of isolation openings are formed in the isolation structure layer, and the isolation opening exposes at least a part of the first electrode; a part of the isolation structure layer includes a through hole, the first touch electrode and the main body portion are located in the through hole and spaced apart from the isolation structure layer, two ends of the bridge portion are electrically connected to adjacent one of the main body portions respectively, and the orthographic projection of the bridge portion on the substrate intersects with an orthographic projection of the first touch electrode on the substrate; and sequentially preparing a light-emitting layer and a second electrode in the isolation opening to obtain the touch display panel.

The fifth aspect of the present disclosure provides a display apparatus, including the touch display panel provided by any one of the above embodiments.

According to the touch display panel and the manufacturing method therefor, and the display apparatus provided by the embodiments of the present disclosure, the first touch electrode and the main body portion are disposed in the same layer as the first electrode; alternatively, the first touch electrode and the main body portion are disposed in the isolation structure layer. In other words, the first touch electrode and the second touch electrode are arranged inside the display panel, so that an in cell touch scheme is realized. In this case, on the one hand, four masks required for a touch screen are saved, thereby reducing costs; and on the other hand, a thickness of a display module is reduced.

BRIEF DESCRIPTION OF THE DRAWINGS

FIG. 6 is a top view of a conductive layer where a first electrode is located in the structure shown in FIG. 5a.

FIG. 11 is a flowchart of a manufacturing method for a touch display panel according to an embodiment of the present disclosure.

FIGS. 12a to 12g are schematic diagrams of intermediate products obtained during a process of the manufacturing method shown in FIG. 11.

DETAILED DESCRIPTION OF THE EMBODIMENTS

In the related art, one of commonly used touch schemes for display screens is to embed a touch screen between a color filter and a polarizer of the display screen, commonly known as an on cell touch scheme in the art.

Figure 1:
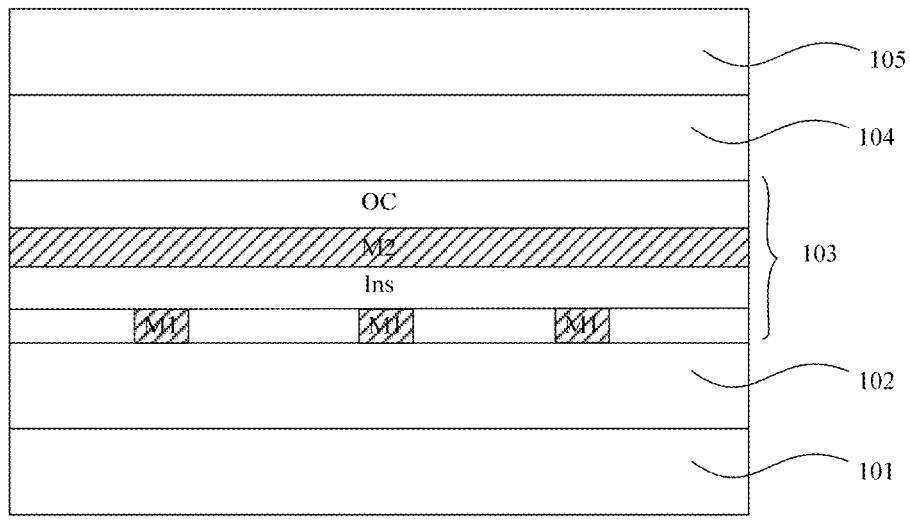
FIG. 1 is a cross-sectional view of a structure of an on cell touch display module in the related art.

FIG. 1 is a cross-sectional view of a structure of an on cell touch display module in the related art. As shown in FIG. 1, the touch display module includes a display panel 101, a light filter 102, a touch screen 103, a polarizer 104, and a cover plate 105 sequentially stacked.

Figure 2:
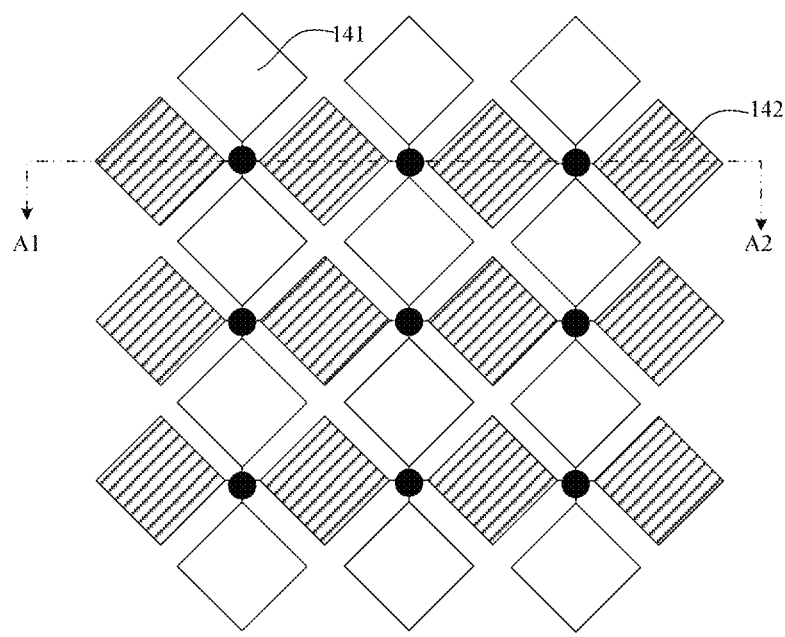
FIG. 2 is a top view of a structure of a mutual capacitive touch screen in the related art.

The touch screen 103 may be a self capacitive touch screen or a mutual capacitive touch screen. The mutual capacitive touch screen is widely used due to advantages including true multi-touch and fast speed. FIG. 2 is a top view of a structure of a mutual capacitive touch screen in the related art. As shown in FIG. 2, the touch screen 103 includes a first touch electrode 141 and a second touch electrode 142 intersected with the first touch electrode 141. The first touch electrode 141 and the second touch electrode 142 are insulated from each other at an intersection position.

Specifically, a cross-sectional line A1A2 shown in FIG. 2 corresponds to the cross-sectional structure shown in FIG. 1. As shown in FIG. 1 and FIG. 2, the touch screen 103 includes a first metal layer M1, an insulation layer Ins, a second metal layer M2, and an insulation adhesive layer OC sequentially stacked. At the intersection position, a bridge portion of the second touch electrode 142 is located in the first metal layer M1, and the second touch electrode 142 except for the bridge portion and the first touch electrode 141 are located in the second metal layer M2. The insulation layer Ins is used for insulating the first touch electrode 141 from the second touch electrode 142 at the intersection position.

In a preparation process of the touch screen 103, a manufacturing procedure of each of the four film layers included in the touch screen 103, namely the first metal layer M1, insulation layer Ins, second metal layer M2, and insulation adhesive layer OC, requires a patterning process. In other words, the preparation process of the touch screen requires four masks, resulting in a high cost. Meanwhile, a thickness of the touch display module is increased as a result of integration of the touch screen 103, which is not conducive to thinning of a product.

In view of this, embodiments according to the present disclosure provides a touch display panel and a manufacturing method therefor, and a display apparatus. The first touch electrode 131 and the second touch electrode 132 are disposed inside the display panel, and a film layer inside the display panel is utilized to function as the insulation layer Ins and the insulation adhesive layer OC, so that an in cell touch scheme is achieved. In this case, on the one hand, the four masks required for the touch screen are saved, thereby reducing costs; and on the other hand, a thickness of the display module is reduced.

Technical solutions in embodiments of the present disclosure will be clearly and completely described with reference to accompanying drawings corresponding to the embodiments of the present disclosure in the following description. Apparently, the described embodiments are only some, not all, embodiments of the present disclosure. Based on the embodiments in the present disclosure, all other embodiments obtained by those skilled in the art without creative efforts shall fall within the protection scope of the present disclosure.

Furthermore, in order to better illustrate the present disclosure, numerous specific details are provided in the following specific embodiments. Those skilled in the art should understand that without certain specific details, the present disclosure may also be implemented. In some embodiments, methods and means familiar to those skilled in the art are not described in detail to highlight the main idea of the present disclosure.

It should be noted that similar labels and letters represent similar terms in the following figures. Therefore, once a term is defined in an accompanying drawing, it does not need to be further defined or explained in subsequent accompanying drawings. In addition, if terms such as "first" and "second" appear, the terms are only used to distinguish descriptions and cannot be understood as indicating or implying relative importance.

Figure 3:
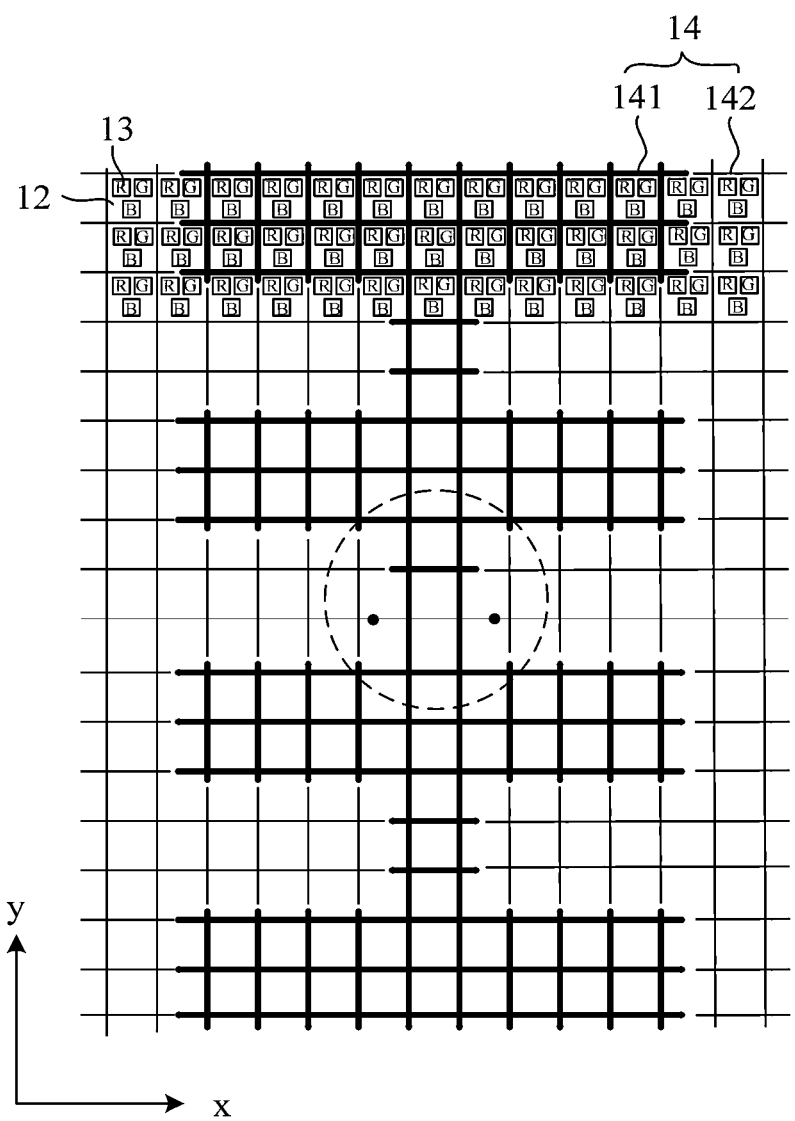
FIG. 3 is a partial top view of a structure of a touch display panel according to an embodiment of the present disclosure.
Figure 4:
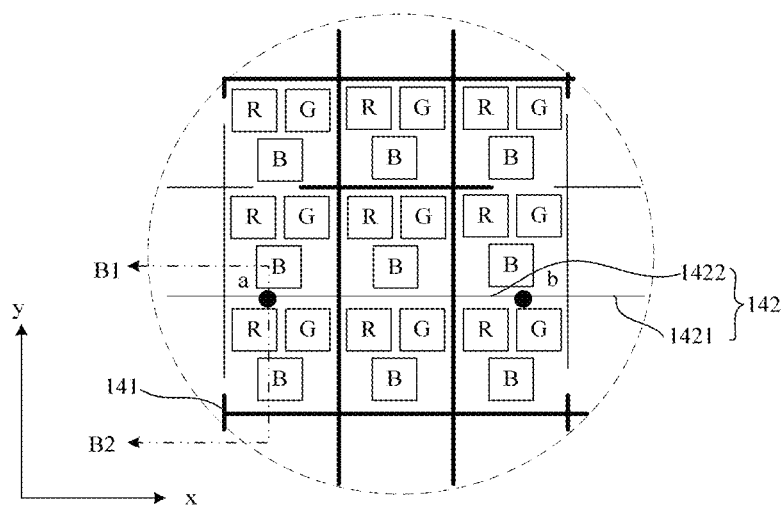
FIG. 4 is a partially enlarged view of FIG. 3.
Figure 5A:
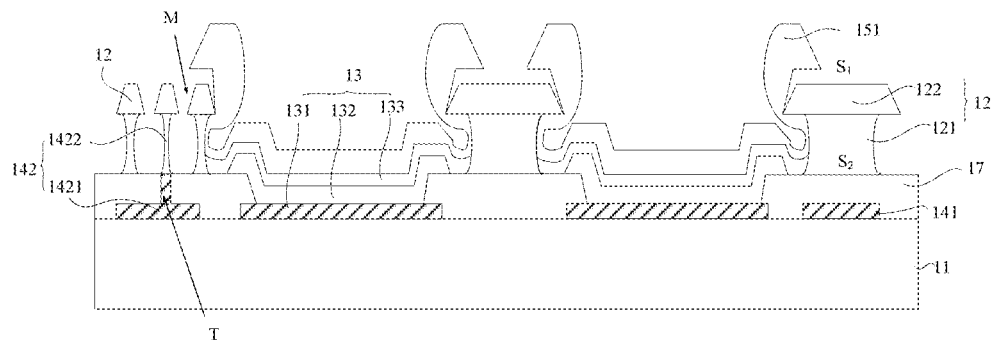
FIG. 5a is a first cross-sectional view of a structure shown in FIG. 4 along line B1B2.

FIG. 3 is a partial top view of a structure of a touch display panel according to an embodiment of the present disclosure. FIG. 4 is a partially enlarged view of FIG. 3. FIG. 5a is a first cross-sectional view of a structure shown in FIG. 4 along line B1B2. As shown in FIG. 3, FIG. 4 and FIG. 5a, a touch display panel includes a substrate 11, an isolation structure layer 12, a plurality of light-emitting devices 13, and a touch electrode 14.

Therein, the substrate 11 may be a base substrate, or an array substrate. The array substrate includes a base substrate and a pixel circuit integrated on the base substrate. The base substrate may be a flexible substrate, such as a polyimide film, an ultra-thin glass; or a hard substrate, such as a glass substrate.

The isolation structure layer 12 is located on a side of the substrate 11, and a plurality of isolation openings are formed in the isolation structure layer 12. The isolation structure layer 12 is configured to isolate the plurality of light-emitting devices 13, so that the light-emitting device 13 is independent from each other.

Patents including No. PCT/CN2023/134518, No. 202310759370.2, No. 202310740412.8, No. 202310707209.0, and No. 202311346196.5 describe related technical solutions of the isolation structure layer, and the contents thereof are incorporated herein by reference for reference purposes.

The plurality of light-emitting devices 13 are located in the plurality of isolation openings. The light-emitting device 13 includes a first electrode 131 facing the substrate 11. Exemplarily, the first electrode 131 includes an anode. The light-emitting device 13 further includes a second electrode 133 facing away from the substrate 11, and a light-emitting layer 132 located between the second electrode 133 and the first electrode 131. The second electrode 133 is located on a side, facing away from the substrate 11, of the first electrode 131. In other words, in a direction gradually away from the substrate 11, the first electrode 131, the light-emitting layer 132, and the second electrode 133 are sequentially stacked.

It should be noted that FIG. 3 only exemplarily shows some of the light-emitting devices 13 in the touch display panel, and in an actual product, the light-emitting devices 13 are distributed fully in a coverage area of the touch electrode 14.

An orthographic projection of the touch electrode 14 on the substrate 11 is located in an interval area between orthographic projections of the plurality of light-emitting devices 13 on the substrate 11. Specifically, the touch electrode 14 includes a first touch electrode 141 and a second touch electrode 142, and the second touch electrode 142 includes a plurality of main body portions 1421 and a bridge portion 1422 (exemplarily, a wire segment AB as shown in FIG. 4). The first touch electrode 141 extends in a second direction y parallel to the substrate 11. The plurality of main body portions 1421 are sequentially arranged in a first direction x parallel to the substrate 11, and the first direction x intersects with the second direction y. Exemplarily, the first direction x is perpendicular to the second direction y. The main body portion 1421 and the bridge portion 1422 are disposed in different layers. Main body portions 1421 adjacent in the first direction are in contact with the bridge portion 1422 by a through hole. An orthographic projection of the bridge portion 1422 on the substrate 11 intersects with an orthographic projection of the first touch electrode 141 on the substrate 11.

Specifically, as shown in FIG. 5a, a shape of an orthographic projection of the touch electrode 14 (including the first touch electrode 141 and the second touch electrode 142) on the substrate 11 is a mesh defined with a plurality of grids. Shapes of the grids may be the same or different. Each grid surrounds an orthographic projection of at least one light-emitting device 13 on the substrate 11. Quantities of the light-emitting devices 13 surrounded by different grids are equal or unequal.

In a case where each grid surrounds orthographic projections of a plurality of light-emitting devices 13 on the substrate 11, as shown in FIG. 5a, an orthographic projection of a part of the isolation structure layer 12 on the substrate 11 covers the orthographic projection of the touch electrode 14 on the substrate 11, and an orthographic projection of a remaining part of the isolation structure layer 12 on the substrate 11 falls to cover the orthographic projection of the touch electrode 14 on the substrate 11.

Figure 5B:
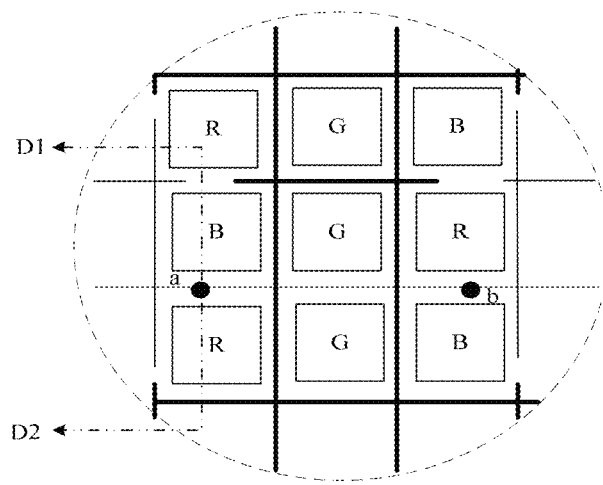
FIG. 5b is a partially enlarged view of a touch display panel according to another embodiment of the present disclosure.
Figure 5C:
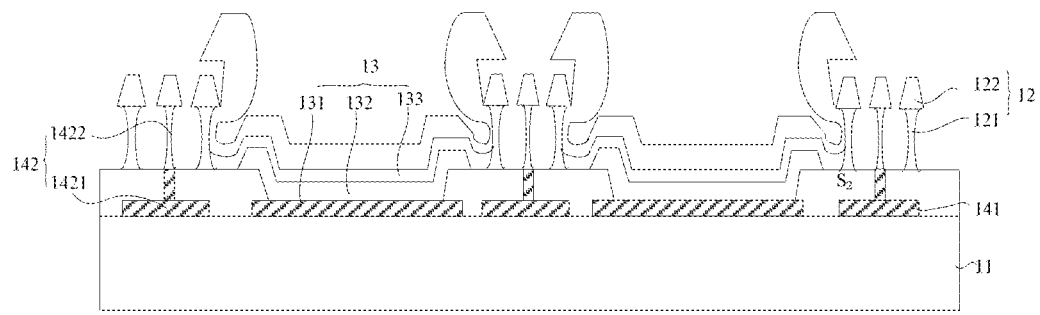
FIG. 5c is a cross-sectional view of a structure shown in FIG. 5b along line D1D2.

FIG. 5b is a partially enlarged view of a touch display panel according to another embodiment of the present disclosure. FIG. 5c is a cross-sectional view of a structure shown in FIG. 5b along line D1D2. As shown in FIG. 5b and FIG. 5c, in a case where each grid surrounds an orthographic projection of a light-emitting device 13 on the substrate 11, the orthographic projection of the isolation structure layer 12 at any position on the substrate 11 covers the orthographic projection of the touch electrode 14 on the substrate 11.

In an embodiment, as shown in FIG. 3 and FIG. 4, each grid of the touch electrode 14 surrounds orthographic projections of a plurality of light-emitting devices 13 on the substrate 11, and the plurality of light-emitting devices 13 surrounded by the same grid constitute a repeat unit of pixel arrangement. The repeat unit of pixel arrangement refers to a minimum repeat unit in a pixel array layout. The pixel mentioned here is equivalent to the light-emitting device 13, that is, the light-emitting device 13 may also be referred to as a pixel. Exemplarily, as shown in FIG. 5b, the repeat unit of pixel arrangement includes a red light-emitting device R, a green light-emitting device G, and a blue light-emitting device B.

The bridge portion 1422 includes at least one wire, and the wire extends in the first direction x. In a case where the bridge portion 1422 includes a plurality of wires, the plurality of wires are sequentially arranged in the second direction y. The plurality of wires are used to form the bridge portion 1422, so that the bridge portion 1422 is more reliable than a single wire.

Figure 6:
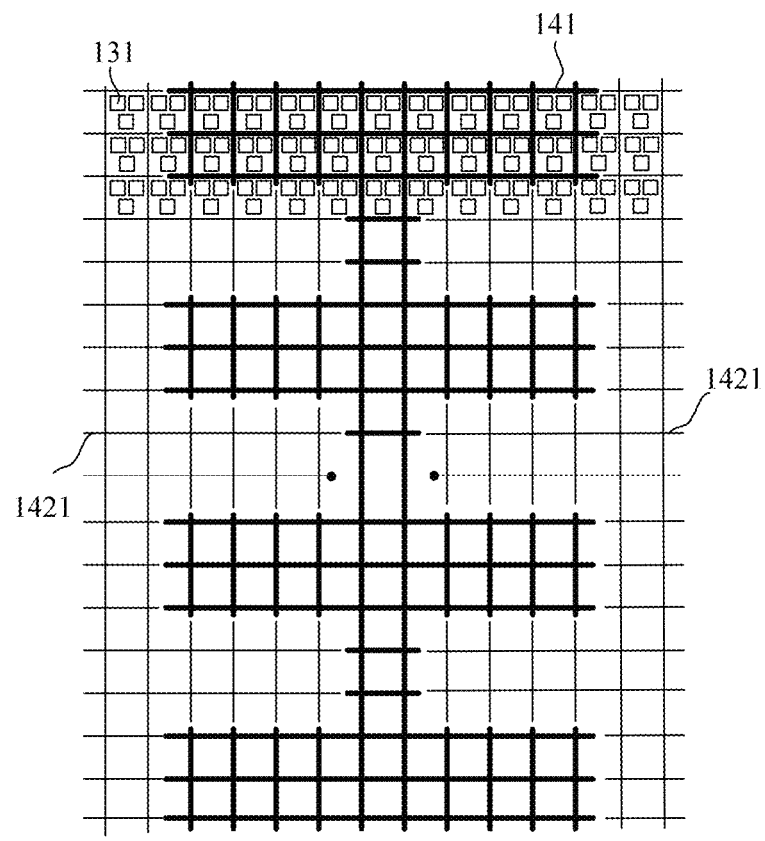

FIG. 6 is a top view of a conductive layer where a first electrode is located in the structure shown in FIG. 5a. As shown in FIG. 5a and FIG. 6, in the embodiment, the first touch electrode 141 and the main body portion 1421 are disposed in a same layer as the first electrode 131. The bridge portion 1422 is disposed in a same layer as the isolation structure layer 12.

Specifically, a shape of the first touch electrode 141 and a shape of the main body portions 1421 are mesh defined with a plurality of grids, and each grid surrounds at least one of the first electrodes 131.

The isolation structure layer 12 includes a first surface S1 facing the substrate 11 and a second surface S2 facing away from the substrate 1. An orthographic projection of the first surface S1 on the substrate 11 is within an orthographic projection range of the second surface S2 on the substrate 11. Exemplarily, a cross-sectional shape of the isolation structure layer 12 may be an inverted trapezoid or similar to an I-shape.

The isolation structure layer 12 includes a conductive portion 121 and a brim portion 122 stacked in sequence, and the conductive portion 121 is located on a side, close to the substrate 11, of the brim portion 122. The light-emitting device 13 further includes a second electrode 133 facing away from the substrate 11. The second electrode 133 is connected to the conductive portion 121 by means of lap joint. The light-emitting device 13 further includes a light-emitting layer 132 located between the first electrode 131 and the second electrode 133. Exemplarily, the conductive portion 121 may be designed as an independent film layer, that is, no physical interface exists inside the conductive portion 121, and a material of each part of the conductive portion 121 is the same. Alternatively, the conductive portion 121 may be designed to include at least two film layers stacked together. Exemplarily, the conductive portion 121 is formed by stacked two conductive film layers. Materials of the two conductive film layers may be molybdenum and aluminum, respectively, and a conductive film layer including molybdenum is located between the substrate 11 and a conductive film layer including aluminum. An orthographic projection of the brim portion 122 on the substrate 11 covers an orthographic projection of the conductive portion 121 on the substrate 11. A material of the brim portion 122 may be an organic material, an inorganic material or a metal material. In a case where the material of the brim portion 122 is a metal material, the material of the brim portion 122 may be titanium.

A part of the isolation structure layer 12 may include at least one through hole M. Exemplarily, the through hole M may be a strip-shaped through hole. The bridge portion 1422 is located in the through hole M and spaced apart from the isolation structure layer 12. In an embodiment, the touch display panel may further include an insulating portion (not shown in the figures), and the insulating portion is filled in an interval area between the isolation structure layer 12 and the bridge portion 1422, so as to avoid short circuit between the bridge portion 1422 and the conductive portion 121.

In an embodiment, the touch display panel may further include a pixel defining layer 17 located on a side, facing the substrate 11, of the isolation structure layer 12. An orthographic projection of the isolation structure layer 12 on the substrate 11 is within an orthographic projection of the pixel defining layer 17 on the substrate 11. A plurality of pixel openings are formed in the pixel defining layer 17. The light-emitting device 13 is further located in the pixel opening, and the bridge portion 1422 is in contact with the main body portion 1421 by a through hole T penetrating through the pixel defining layer 17.

According to the touch display panel provided by the embodiment, the first touch electrode 141 and the main body portion 1421 of the second touch electrode 142 are disposed in the same layer as the first electrode 131 of the light-emitting device 13, and the bridge portion 1422 is disposed in the isolation structure layer 12, so that an in-cell touch scheme is achieved. In this case, on the one hand, there is no need to additionally prepare a touch screen, thereby saving four masks required by the touch screen, and reducing costs; and on the other hand, a thickness of the touch display module may be reduced.

In an embodiment, as shown in FIG. 5a, the touch display panel may further include a plurality of inorganic encapsulation units 151. The plurality of inorganic encapsulation units 151 and the plurality of isolation openings are in one-to-one correspondence, and orthographic projections of the plurality of inorganic encapsulation units 151 on the substrate 11 cover orthographic projections of the plurality of isolation openings on the substrate 11.

In an embodiment, the touch display panel may further include an organic encapsulation layer and an inorganic encapsulation layer (not shown in the figure) sequentially stacked on a side, facing away from the substrate 11, of the inorganic encapsulation unit 151. An orthographic projection of the organic encapsulation layer on the substrate 11 covers the orthographic projection of the inorganic encapsulation unit 151 on the substrate 11, and the organic encapsulation layer fills an interval area between the bridge portion 1422 and the isolation structure layer 12. An orthographic projection of the inorganic encapsulation layer on the substrate 11 covers the orthographic projection of the organic encapsulation layer on the substrate 11. Thus, the inorganic film layer and the organic film layer are alternatively stacked to form a thin film encapsulation structure with a good encapsulation effect.

Figure 7:
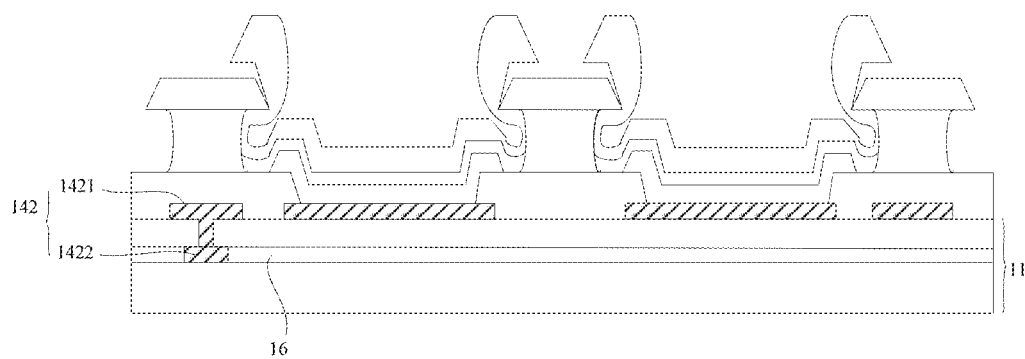
FIG. 7 is a second cross-sectional view of a structure shown in FIG. 4 along line B1B2.

FIG. 7 a second cross-sectional view of a structure shown in FIG. 4 along line B1B2. As shown in FIG. 7, a difference between a touch display panel provided by the present embodiment and the touch display panel shown in FIG. 5a lies in that a position of the bridge portion 1422 is different.

Specifically, as shown in FIG. 7, in the embodiment, the substrate 11 includes at least one conductive layer, and the bridge portion 1422 is located in one conductive layer. Exemplarily, the at least one conductive layer includes an adjacent conductive layer 16 closest to the isolation structure layer 12, and the bridge portion 1422 is located in the adjacent conductive layer 16. With the bridge portion 1422 being located in the adjacent conductive layer 16, a distance between the adjacent conductive layer 16 and the bridge portion 1422 is closer than that when the bridge portion 1422 is located in the other conductive layers in the substrate 11, thereby facilitating electrical connection.

It should be noted that other conductive structures in the adjacent conductive layer 16 are not shown. Exemplarily, the adjacent conductive layer 16 is located on a side, away from the isolation structure layer 12, of the main body portion 1421. The adjacent conductive layer 16 may further include a data signal wire, a scan signal wire, an initialization signal wire, a power signal wire, and the like. Meanwhile, the bridge portion 1422 may also be disposed in a conductive layer other than the adjacent conductive layer 16, and is located on a same conductive layer as at least one of the data signal wire, the scan signal wire, the initialization signal wire, and the power signal wire.

Figure 8:
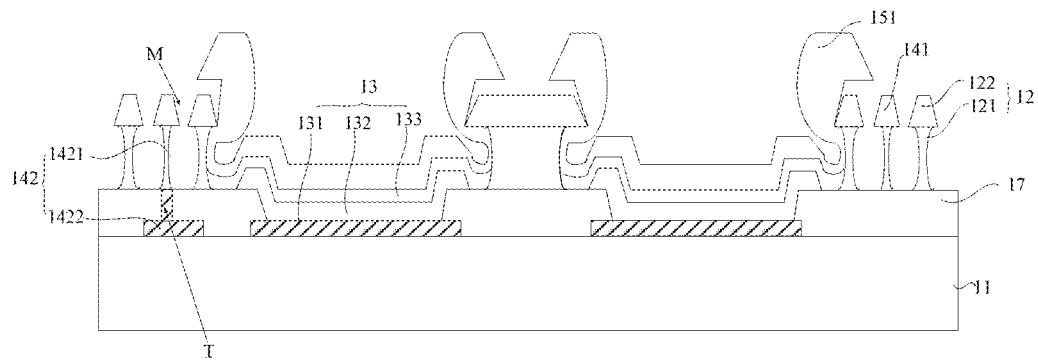
FIG. 8 is a third cross-sectional view of a structure shown in FIG. 4 along line B1B2.
Figure 9:
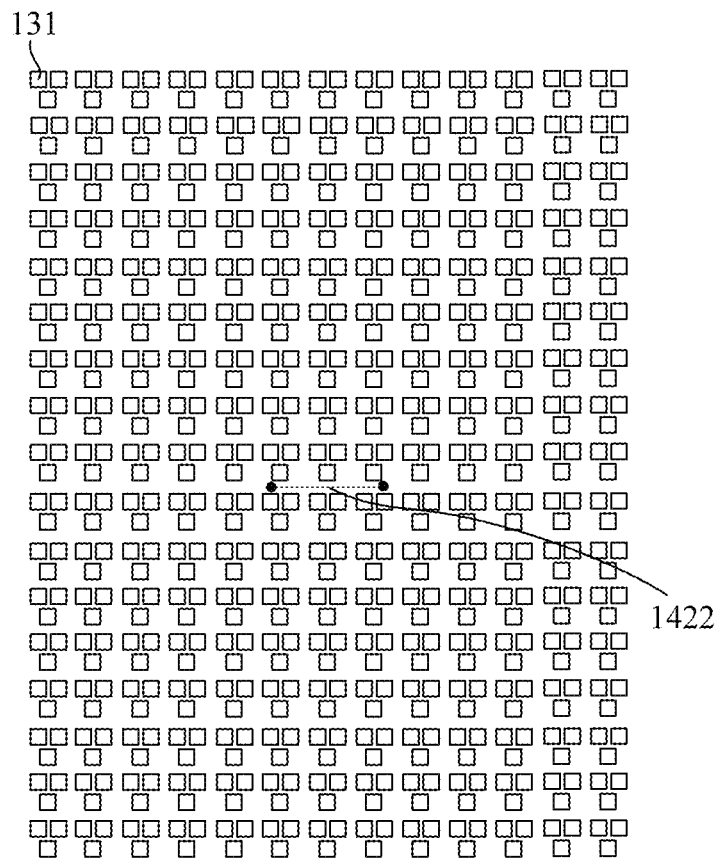
FIG. 9 is a top view of a conductive layer where a first electrode is located in the structure shown in FIG. 8.

FIG. 8 is a third cross-sectional view of a structure shown in FIG. 4 along line B1B2. FIG. 9 is a top view of a conductive layer where a first electrode is located in the structure shown in FIG. 8. A difference between the touch display panel shown in FIG. 8 and FIG. 9 and the touch display panel shown in FIG. 5a and FIG. 6 lies in that in combination with FIG. 3, FIG. 8 and FIG. 9, in the embodiment, the first touch electrode 141 and the main body portion 1421 are disposed in a same layer as the isolation structure layer 12, and the bridge portion 1422 and the first electrode 131 are disposed in a same layer.

Specifically, the bridge portion 1422 is located between adjacent first electrodes 131. Exemplarily, the bridge portion 1422 includes at least one wire, and the wire is disposed between the adjacent first electrodes 131. The wire extends in the first direction x. In a case where the bridge portion 1422 includes a plurality of wires, the plurality of wires are sequentially arranged in the second direction y.

The isolation structure layer 12 includes a conductive portion 121 and an insulating portion. A part of the isolation structure layer 12 includes a plurality of grid-shaped grooves, and the plurality of grid-shaped grooves penetrate through at least a part of the conductive portion 121 in a thickness direction. The insulating portion is located between the conductive portion 121 and the first touch electrode 141, and between the conductive portion 121 and the main body portion 1421.

Specifically, the isolation structure layer 12 includes a first surface S1 facing the substrate 11 and a second surface S2 facing away from the substrate 11. An orthographic projection of the first surface S1 on the substrate 11 is within an orthographic projection of the second surface S2 on the substrate 11.

The isolation structure layer 12 includes a conductive portion 121 and a brim portion 122 stacked is sequence, and the brim portion 122 is located on a side, facing away from to the substrate 11, of the conductive portion 121. The light-emitting device 13 further includes a second electrode 133 facing away from the substrate 11, and the second electrode 133 is connected to the conductive portion 121 by means of lap joint. Exemplarily, the conductive portion 121 may be designed as an independent film layer, that is, no physical interface exists inside the conductive portion 121, and a material of each part of the conductive portion 121 is the same. Alternatively, the conductive portion 121 may be designed to include at least two film layers stacked together. Exemplarily, the conductive portion 121 is formed by stacked two conductive film layers. Materials of the two conductive film layers may be molybdenum and aluminum, respectively, and a conductive film layer including molybdenum is located between the substrate 11 and a conductive film layer including aluminum. An orthographic projection of the brim portion 122 on the substrate 11 covers an orthographic projection of the conductive portion 121 on the substrate 11. A material of the brim portion 122 may be an organic material, an inorganic material or a metal material. In a case where the material of the brim portion 122 is a metal material, the material of the brim portion 122 may be titanium.

A part of the isolation structure layer 12 may include at least one through hole M. Exemplarily, the through hole M may be a grid-shaped through hole. The first touch electrode 141 and the main body portion 1421 are located in the through hole M and spaced apart from the isolation structure layer 12. In an embodiment, the touch display panel may further include an insulating portion (not shown in the figures), and the insulating portion is filled in an interval area between the isolation structure layer 12 and the first touch electrode 141, and an interval area between the isolation structure layer 12 and the main body portion 1421.

In an embodiment, the touch display panel may further include a pixel defining layer 17 located on a side, facing the substrate 11, of the isolation structure layer 12. An orthographic projection of the isolation structure layer 12 on the substrate 11 is within an orthographic projection of the pixel defining layer 17 on the substrate 11. A plurality of pixel openings are formed in the pixel defining layer 17. The light-emitting device 13 is also located in the pixel opening. The main body portion 1421 is in contact with the bridge portion 1422 by a through hole T penetrating through the pixel defining layer 17.

According to the touch display panel provided by the embodiment, the first touch electrode 141 and the main body portion 1421 of the second touch electrode 142 are disposed in the isolation structure layer 12, and the bridge portion 1422 of the second touch electrode 142 and the first electrode 131 of the light-emitting device 13 are disposed in a same layer, so that an in-cell touch scheme is achieved. In this case, on the one hand, there is no need to additionally prepare a touch screen, thereby saving four masks required by the touch screen, and reducing costs; and on the other hand, a thickness of the touch display module may be reduced.

Figure 10:
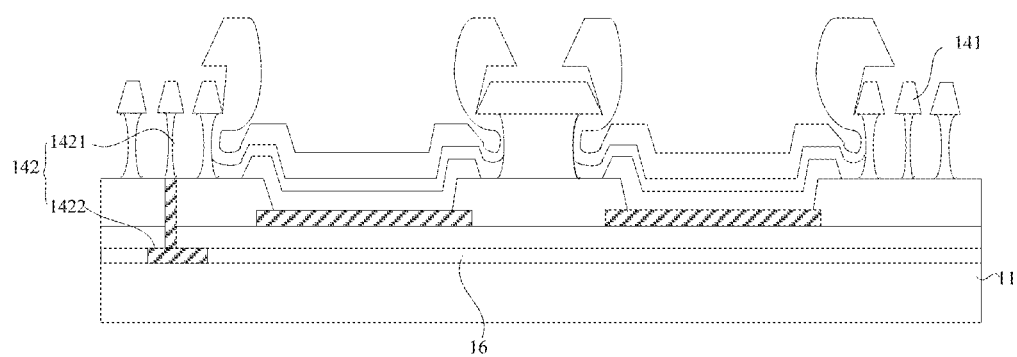
FIG. 10 is a fourth cross-sectional view of a structure shown in FIG. 4 along line B1B2.

FIG. 10 is a fourth cross-sectional view of a structure shown in FIG. 4 along line B1B2. A difference between the touch display panel shown in FIG. 10 and the touch display panel shown in FIG. 9 and FIG. 8 lies in that a position of the bridge portion 1422 is different.

Specifically, as shown in FIG. 10, in the embodiment, the substrate 11 includes at least one conductive layer, and the bridge portion 1422 is located in one conductive layer. Exemplarily, the at least one conductive layer includes an adjacent conductive layer 16 closest to the isolation structure layer 12, and the bridge portion 1422 is located in the adjacent conductive layer 16. With the bridge portion 1422 being located in the adjacent conductive layer 16, a distance between the adjacent conductive layer 16 and the bridge portion 1422 is closer than that when the bridge portion 1422 is located in the other conductive layers in the substrate 11, thereby facilitating electrical connection.

It should be noted that other conductive structures in the adjacent conductive layer 16 are not shown. Exemplarily, the adjacent conductive layer 16 may further include a data signal wire, a scan signal wire, an initialization signal wire, a power signal wire, and the like. Meanwhile, the bridge portion 1422 may also be disposed in a conductive layer other than the adjacent conductive layer 16, and is located on a same conductive layer as at least one of the data signal wire, the scan signal wire, the initialization signal wire, and the power signal wire.

Embodiments of the present disclosure further provide a manufacturing method for a touch display panel. FIG. 11 is a flowchart of a manufacturing method for a touch display panel according to an embodiment of the present disclosure. FIGS. 12a to 12g are schematic diagrams of intermediate products obtained during a process of the manufacturing method shown in FIG. 11. As shown in FIG. 11, the manufacturing method for the touch display panel includes the following steps.

Step S1110: synchronously preparing a plurality of first electrodes, a first touch electrode and a plurality of main body portions on a substrate, where the first touch electrode and the main body portion are both located between adjacent first electrodes.

Figure 12B:
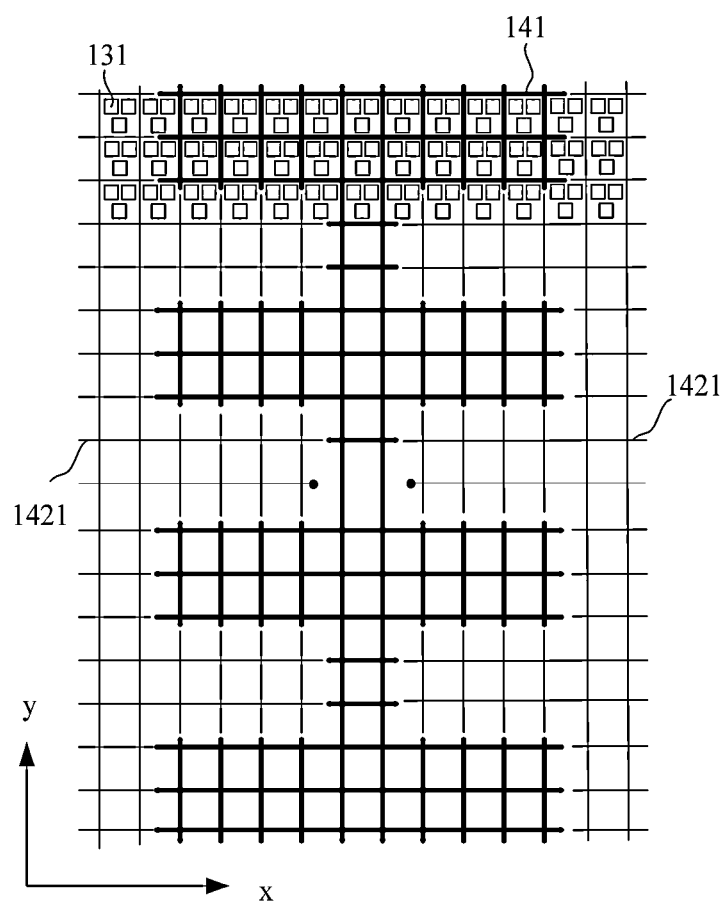

Specifically, a vacuum evaporation process is adopted, so that a conductive material layer is evaporated on the substrate 11 shown in FIG. 12a. The plurality of first electrodes 131, the first touch electrode 141 and the plurality of main body portions 1421 are obtained through a patterning process performed on the conductive material layer, as shown in FIG. 12b.

Exemplarily, the first touch electrode 141 extends in a second direction y, and the plurality of main body portions 1421 are sequentially arranged in a first direction x. The first touch electrode 141 and the plurality of main body portions 1421 are grid structures, and each grid surrounds at least one first electrode 131.

The substrate 11 may be a base substrate, or an array substrate. The array substrate includes a base substrate and a pixel circuit integrated on the base substrate. The base substrate may be a flexible substrate, such as a polyimide film, an ultra-thin glass; or a hard substrate, such as a glass substrate.

Figure 12C:
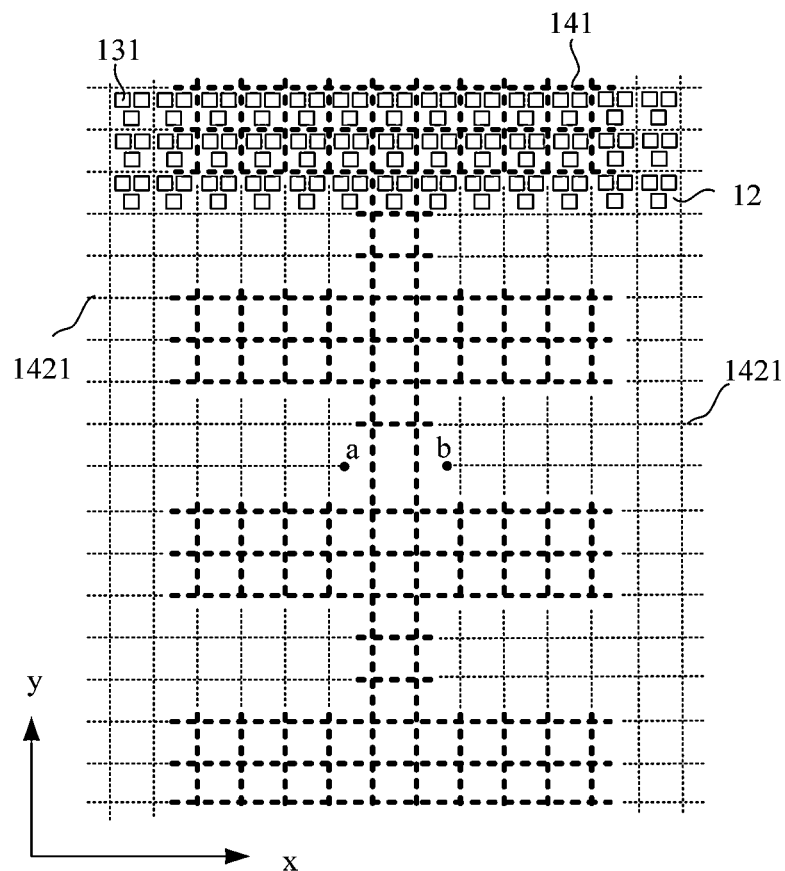
Figure 12D:
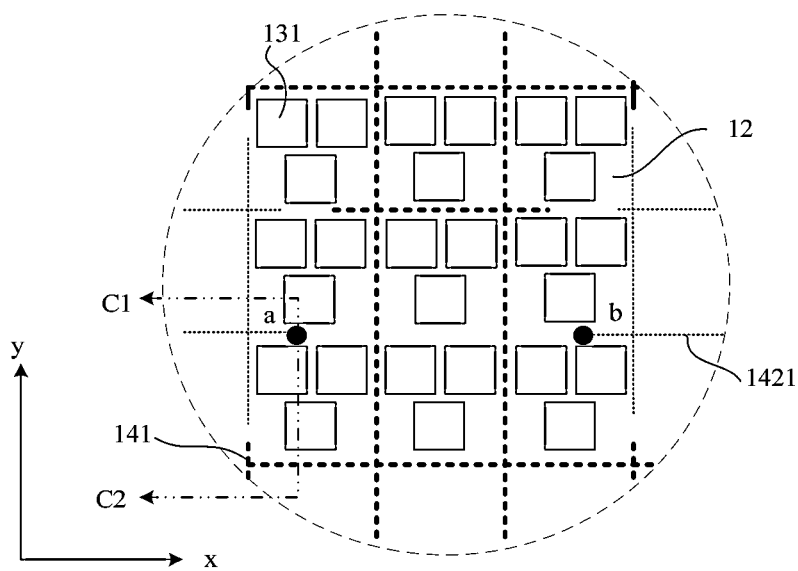
Figure 12E:
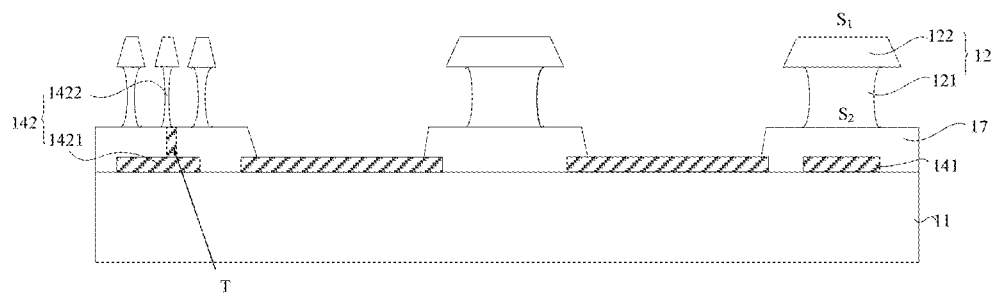

Step S1120: synchronously preparing an isolation structure layer and a bridge portion on the substrate, where an orthographic projection of the isolation structure layer on the substrate covers an orthographic projection of the first touch electrode and orthographic projections of the plurality of main body portions on the substrate respectively, a plurality of isolation openings are formed in the isolation structure layer, and the isolation opening exposes at least a part of the first electrode. With reference to FIG. 12c, FIG. 12d, and FIG. 12e, where FIG. 12d is a partially enlarged view of FIG. 12c and FIG. 12e is a cross-sectional view of structure shown in FIG. 12d along line C1C2, a part of the isolation structure layer 12 includes a through hole M. Exemplarily, as shown in FIG. 12d, the through hole M is disposed between a point A and a point B. The bridge portion 1422 is located in the through hole M and spaced apart from the isolation structure layer 12. Two ends of the bridge portion 1422 are electrically connected to adjacent main body portions 1421, respectively, and an orthographic projection of the bridge portion 1422 on the substrate 11 intersects with an orthographic projection of the first touch electrode 141 on the substrate 11.

Specifically, at least one isolation material layer is prepared on the substrate 11, and the at least one isolation material layer is patterned to obtain the isolation structure layer 12 and the bridge portion 1422. Exemplarily, the at least one isolation material layer includes a conductive material layer and an insulating material layer stacked in sequence, and the insulating material layer includes an organic material layer or an inorganic material layer.

In an embodiment, before Step S1120, the method may further include the following step. Step S1115: preparing a pixel defining layer on the substrate, and performing etching on the pixel defining layer to form a through hole. The pixel defining layer 17 covers the first touch electrode 141 and the main body portion 1421. A plurality of pixel openings are formed in the pixel defining layer 17, and the pixel opening exposes at least a part of the first electrode 131. The through hole T exposes the main body portion 1421. Foe example, the through holes T are provided at a point A and a point B in the pixel defining layer 17.

The isolation structure layer 12 includes a conductive portion 121 and a brim portion 122 stacked in sequence, and the brim portion 122 is located on a side, facing away from to the substrate 11, of the conductive portion 121. The light-emitting device 13 further includes a second electrode 133 facing away from the substrate 11. The second electrode 133 is connected to the conductive portion 121 by means of lap joint. Exemplarily, the conductive portion 121 may be designed as an independent film layer, that is, no physical interface exists inside the conductive portion 121, and a material of each part of the conductive portion 121 is the same. Alternatively, the conductive portion 121 may be designed to include at least two film layers stacked together. For example, the conductive portion 121 is formed by stacked two conductive film layers. Materials of the two conductive film layers may be molybdenum and aluminum, respectively, and a conductive film layer including molybdenum is located between the substrate 11 and a conductive film layer including aluminum. An orthographic projection of the brim portion 122 on the substrate 11 covers an orthographic projection of the conductive portion 121 on the substrate 11. A material of the brim portion 122 may be an organic material, an inorganic material or a metal material. In a case where the material of the brim portion 122 is a metal material, the material of the brim portion 122 may be titanium.

Figure 12F:
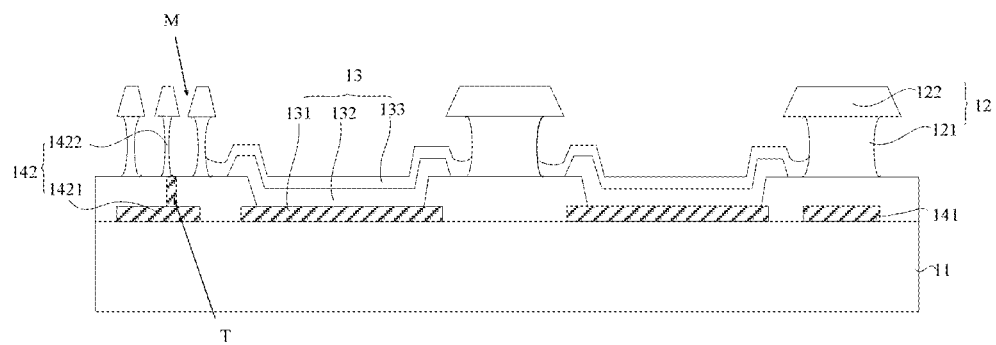

Referring to FIG. 12f, Step S1130: sequentially preparing a light-emitting layer and a second electrode in the isolation opening to obtain the touch display panel.

Figure 12G:
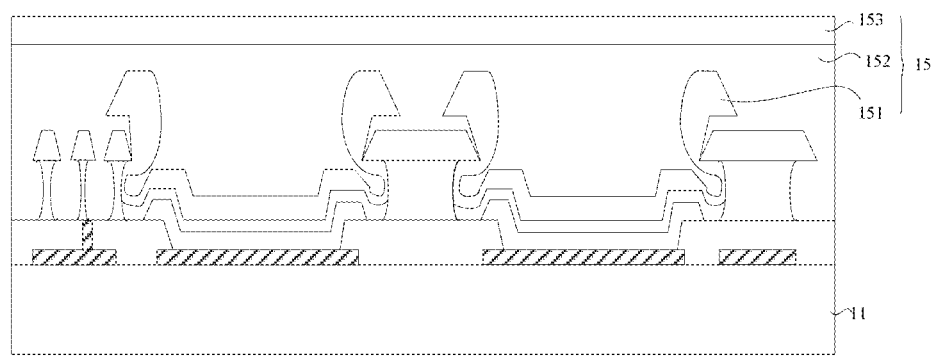

In an embodiment, as shown in FIG. 12g, after Step S1130, the method further includes: preparing a thin film encapsulation structure. Furthermore, the method further includes the following step.

Step S1140: preparing an organic encapsulation layer on a side, facing away from the substrate, of the second electrode, where the organic encapsulation layer fills an interval area between the isolation structure layer and the bridge portion, and an orthographic projection of the organic encapsulation layer on the substrate covers orthographic projections of the second electrode, the isolation structure layer, and the bridge portion on the substrate.

The thin film encapsulation structure includes a plurality of inorganic encapsulation units 151, an organic encapsulation layer 152, and an inorganic encapsulation layer 153 stacked in sequence. The plurality of inorganic encapsulation units 151 and the plurality of isolation openings are in one-to-one correspondence, and an orthographic projection of the inorganic encapsulation unit 151 on the substrate 11 covers an orthographic projection of the isolation opening on the substrate 11. An orthographic projection of the organic encapsulation layer 152 on the substrate 11 covers the orthographic projections of the plurality of inorganic encapsulation units 151 on the substrate 11. And the organic encapsulation layer 152 is filled in an interval area between the bridge portion 1422 and the isolation structure layer 12. An orthographic projection of the inorganic encapsulation layer 153 on the substrate 11 covers the orthographic projection of the organic encapsulation layer 152 on the substrate 11.

It should be noted that the thin film encapsulation structure provided herein is only exemplary, and a quantity and a stacking relationship of the organic encapsulation layer and the inorganic encapsulation layer in the thin film encapsulation structure may be reasonably adjusted according to an actual requirement.

According to the manufacturing method for the touch display panel provided in the embodiment, the first touch electrode 141 and the main body portion 1421 of the second touch electrode 142 are disposed in the same layer as the first electrode 131 of the light-emitting device 13, and the bridge portion 1422 is disposed in the isolation structure layer 12, so that an in-cell touch scheme is achieved. In this case, on the one hand, there is no need to additionally prepare a touch screen, thereby saving four masks required by the touch screen, and reducing costs; and on the other hand, a thickness of the touch display module may be reduced.

Figure 13:
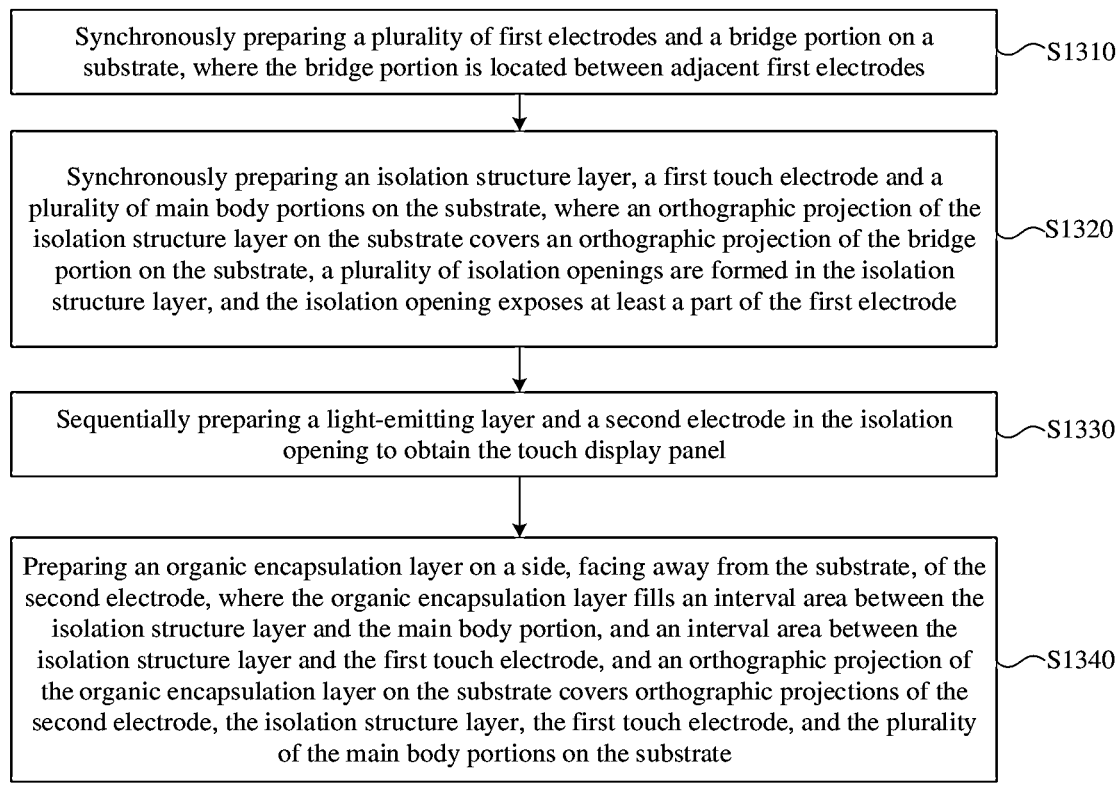
FIG. 13 is a flowchart of a manufacturing method for a touch display panel according to another embodiment of the present disclosure.

FIG. 13 is a flowchart of a manufacturing method for a touch display panel according to another embodiment of the present disclosure. FIGS. 14a to 14e are schematic diagrams of intermediate products obtained during a process of the manufacturing method shown in FIG. 13. As shown in FIG. 13, the manufacturing method for the touch display panel includes the following steps.

Step S1310: synchronously preparing a plurality of first electrodes and a bridge portion on a substrate, where the bridge portion is located between adjacent first electrodes.

Figure 14A:
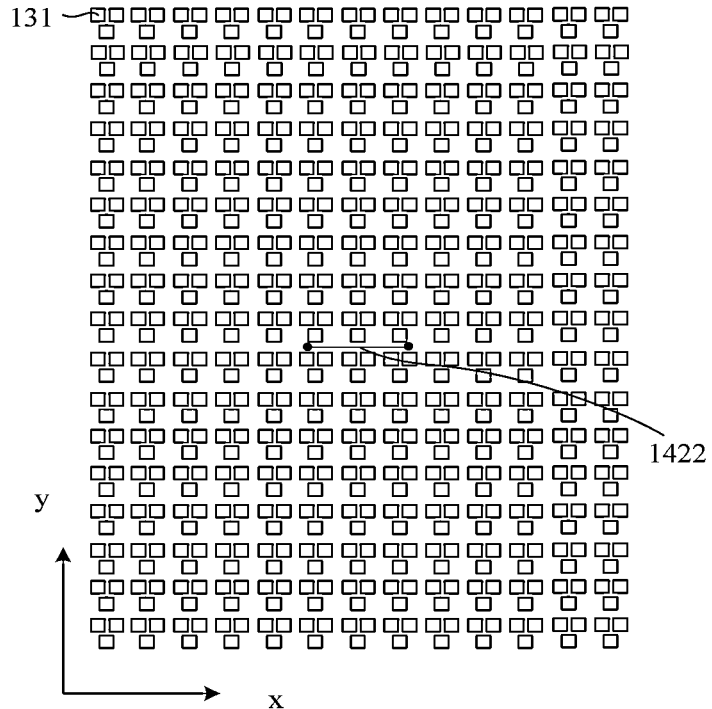
FIGS. 14a to 14e are schematic diagrams of intermediate products obtained during a process of the manufacturing method shown in FIG. 13.

Specifically, a vacuum evaporation process is adopted, so that a conductive material layer is evaporated on the substrate 11 shown in FIG. 12a, the plurality of first electrodes 131 and the bridge portion 1422 are obtained through a patterning process performed on the conductive material layer, as shown in FIG. 14a.

Exemplarily, the bridge portion 1422 includes at least one wire, and the wire is located between adjacent first electrodes 131. The wire extends in a first direction x parallel to the substrate 11. In a case that the bridge portion 1422 includes a plurality of wires, the plurality of wires are sequentially arranged in a second direction y parallel to the substrate 11, and the second direction y intersects with the first direction x. For example, the second direction y is perpendicular to the first direction x. In the second direction y, the plurality of wires and the plurality of first electrodes 131 are alternately arranged.

The substrate 11 may be a base substrate, or an array substrate. The array substrate includes a base substrate and a pixel circuit integrated on the base substrate. The base substrate may be a flexible substrate, such as a polyimide film, an ultra-thin glass; or a hard substrate, such as a glass substrate.

Figure 14B:
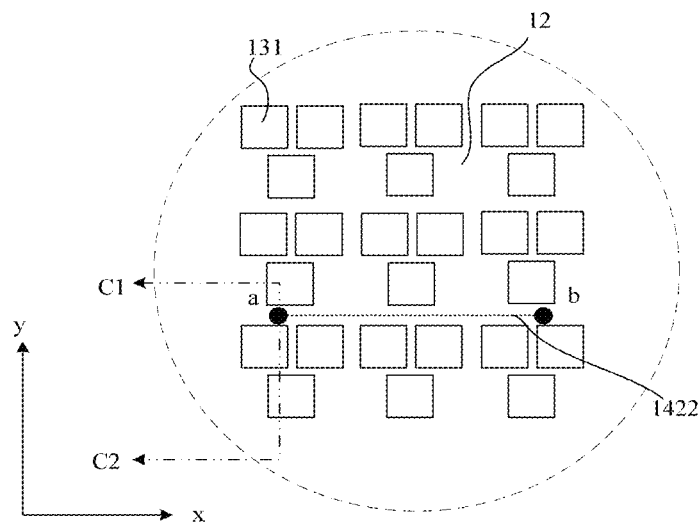
Figure 14C:
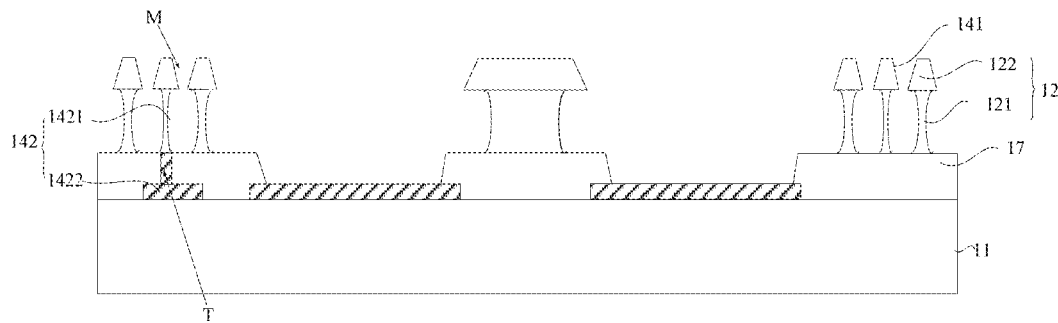

Step S1320: synchronously preparing an isolation structure layer, a first touch electrode and a plurality of main body portions on the substrate, where an orthographic projection of the isolation structure layer on the substrate covers an orthographic projection of the bridge portion on the substrate, a plurality of isolation openings are formed in the isolation structure layer, and the isolation opening exposes at least a part of the first electrode. With reference to FIG. 14*b* and FIG. 14*c*, where FIG. 14*b* is a partially enlarged view of FIG. 14*a*, FIG. 14*c* is a cross-sectional view of the structure shown in FIG. 14*b* along line C1C2, the isolation structure layer 12 includes a through hole M. For example, the through hole M is a grid-shaped through hole, and the first touch electrode 141 and the main body portion 1421 are located in the through hole M and spaced apart from the isolation structure layer 12. Adjacent main body portions 1421 are electrically connected to the bridge portion 1422 respectively, and an orthographic projection of the bridge portion 1422 on the substrate 11 intersects with an orthographic projection of the first touch electrode 141 on the substrate 11.

Specifically, at least one isolation material layer is prepared on the substrate 11, and the at least one isolation material layer is patterned to obtain the isolation structure layer 12, the first touch electrode 141 and the plurality of main body portions 1421. Exemplarily, the at least one isolation material layer includes a conductive material layer and an insulating material layer stacked in sequence, and the insulating material layer includes an organic material layer or an inorganic material layer.

Exemplarily, a plurality of grooves M include a first groove and other grooves other than the first groove. The first groove extends in the first direction x parallel to the substrate 11, and the other grooves are sequentially arranged in the second direction y parallel to the substrate 11. The second direction y intersects with the first direction x. The first groove is provided in interval area between adjacent grooves of the other grooves to avoid communication between the first groove and the other grooves.

In an embodiment, before Step S1320, the method further includes Step S1315: preparing a pixel defining layer on the substrate, and performing etching in the pixel defining layer to obtain a through hole. The pixel defining layer 17 covers the bridge portion 1422. A plurality of pixel openings are formed in the pixel defining layer 17, and the pixel opening exposes at least a part of the first electrode 131. The through hole T exposes the bridge portion 1422. For example, the through hole T is provided at a point A and a point B in the pixel defining layer 17.

The isolation structure layer 12 includes a conductive portion 121 and a brim portion 122 stacked is sequence, and the brim portion 122 is located on a side, facing away from to the substrate 11, of the conductive portion 121. The light-emitting device 13 further includes a second electrode 133 facing away from the substrate 11, and the second electrode 133 is connected to the conductive portion 121 by means of lap joint. Exemplarily, the conductive portion 121 may be designed as an independent film layer, that is, no physical interface exists inside the conductive portion 121, and a material of each part of the conductive portion 121 is the same. Alternatively, the conductive portion 121 may be designed to include at least two film layers stacked together. Exemplarily, the conductive portion 121 is formed by stacked two conductive film layers. Materials of the two conductive film layers may be molybdenum and aluminum, respectively, and a conductive film layer including molybdenum is located between the substrate 11 and a conductive film layer including aluminum. An orthographic projection of the brim portion 122 on the substrate 11 covers an orthographic projection of the conductive portion 121 on the substrate 11. A material of the brim portion 122 may be an organic material, an inorganic material or a metal material. In a case where the material of the brim portion 122 is a metal material, the material of the brim portion 122 may be titanium.

Figure 14D:
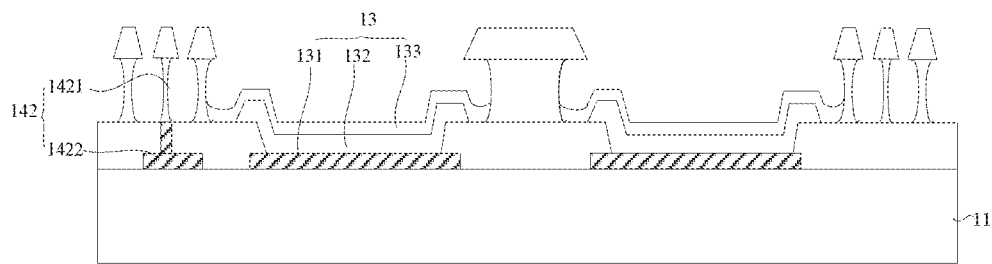

Referring to FIG. 14*d*, Step S1330: sequentially preparing a light-emitting layer and a second electrode in the isolation opening to obtain the touch display panel.

Figure 14E:
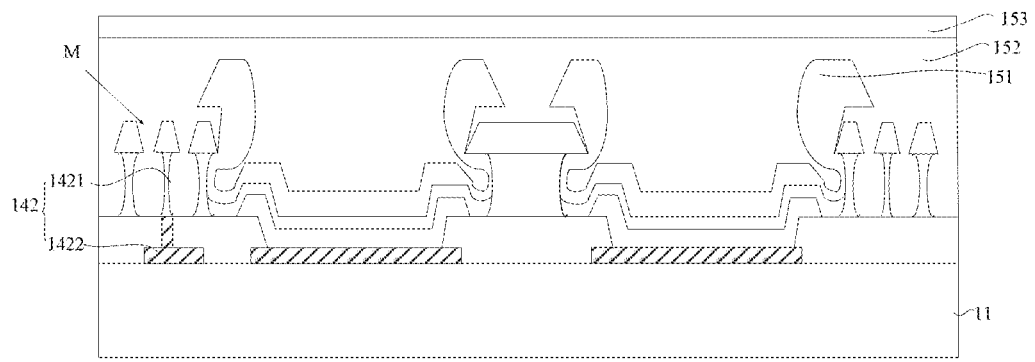

In an embodiment, as shown in FIG. 14*e*, after Step S1330, the method further includes: preparing a thin film encapsulation structure. Furthermore, the method further includes the following step.

Step S1340: preparing an organic encapsulation layer on a side, facing away from the substrate, of the second electrode, where the organic encapsulation layer fills an interval area between the isolation structure layer and the main body portion, and an interval area between the isolation structure layer and the first touch electrode, and an orthographic projection of the organic encapsulation layer on the substrate covers orthographic projections of the second electrode, the isolation structure layer, the first touch electrode, and the plurality of the main body portions on the substrate.

The thin film encapsulation structure includes an inorganic encapsulation unit 151, an organic encapsulation layer 152, and an inorganic encapsulation layer 153 stacked in sequence. The plurality of inorganic encapsulation units 151 and the plurality of isolation openings are in one-to-one correspondence, and an orthographic projection of the inorganic encapsulation unit 151 on the substrate 11 covers an orthographic projection of the isolation opening on the substrate 11. An orthographic projection of the organic encapsulation layer 152 on the substrate 11 covers the orthographic projections of the plurality of inorganic encapsulation units 151 on the substrate 11. And the organic encapsulation layer 152 is filled in an interval area between the bridge portion 1422 and the isolation structure layer 12. An orthographic projection of the inorganic encapsulation layer 153 on the substrate 11 covers the orthographic projection of the organic encapsulation layer 152 on the substrate 11.

It should be noted that the thin film encapsulation structure provided herein is only exemplary, and a quantity and a stacking relationship of the organic encapsulation layer and the inorganic encapsulation layer in the thin film encapsulation structure may be reasonably adjusted according to an actual requirement.

According to the manufacturing method for the touch display panel provided in the embodiment, the first touch electrode 141 and the main body portion 1421 of the second touch electrode 142 are disposed in the isolation structure layer 12, and the bridge portion 1422 of the second touch electrode 142 and the first electrode 131 of the light-emitting device 13 are disposed in a same layer, so that an in-cell touch scheme is achieved. In this case, on the one hand, there is no need to additionally prepare a touch screen, thereby saving four masks required by the touch screen, and reducing costs; and on the other hand, a thickness of the touch display module may be reduced.

Figure 15:
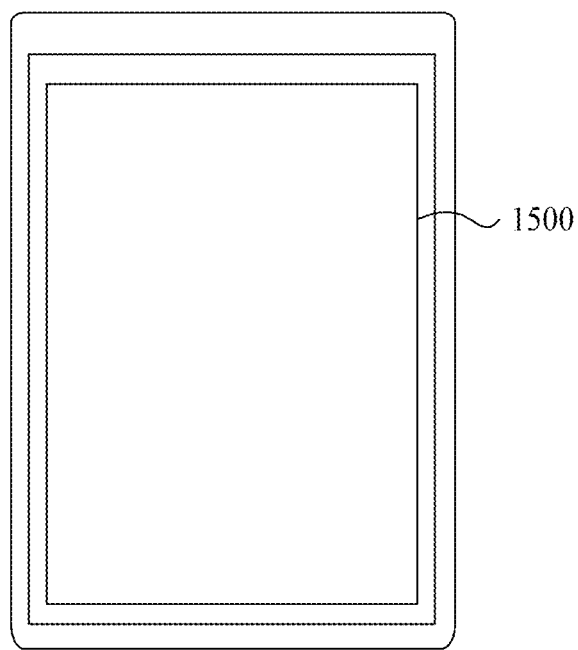
FIG. 15 is a schematic structural diagram of a display apparatus according to an embodiment of the present disclosure.

The present disclosure further provides a display apparatus. FIG. 15 is a schematic structural diagram of a display apparatus according to an embodiment of the present disclosure. As shown in FIG. 15, the display apparatus includes the touch display panel 1500 provided in any one of the above embodiments. The display apparatus is a product equipped with an image display function.

For example, the display apparatus may be configured to display a static image, such as a picture or a photo. The display apparatus may further be configured to display a dynamic image, such as a video. The display apparatus may be a laptop computer, a mobile phone, a handheld or portable computer, a camera, a camcorder, a vehicle-mounted intelligent central control screen, a calculator, a smart watch, a global positioning system (GPS) navigator, an electronic photo, an electronic billboard or indicator, a projector, and the like.

In addition, the display apparatus may further have functions such as photographing, video recording, fingerprint recognition, and face recognition. Correspondingly, the display apparatus may further include at least one functional module configured to implement the foregoing functions, such as an under-screen camera, and an under-screen fingerprint recognition sensor.

The above describes the basic principles of the present disclosure in conjunction with specific embodiments. However, it should be pointed out that the advantages, benefits, effects, and the like mentioned in the present disclosure are only examples and not limitations, and cannot be considered as essential for each embodiment of the present disclosure. In addition, the specific details disclosed above are only for the purpose of providing examples and facilitating understanding, and are not limited. The above details do not limit the necessity for this disclosure to use the above specific details for implementation.

For the purpose of illustration and description, the above description is provided. Furthermore, the description is not intended to limit the embodiments of the present disclosure to the form disclosed herein. Although multiple exemplary aspects and embodiments are discussed above, those skilled in the art recognize certain variations, modifications, alterations, additions, and sub-combinations thereof.

What is claimed is:

1. A touch display panel, comprising:
   a substrate;
   an isolation structure layer, located on a side of the substrate, wherein a plurality of isolation openings are formed in the isolation structure layer;
   a plurality of light-emitting devices, located in the isolation openings and comprising a first electrode facing the substrate; and
   a touch electrode, comprising a first touch electrode and a second touch electrode, the second touch electrode comprising a plurality of main body portions and a plurality of bridge portions disposed in different layers from the main body portions, one of the bridge portions being connected to an adjacent one of the main body portions by a through hole, and an orthographic projection of at least one of the bridge portions on the substrate intersecting with an orthographic projection of the first touch electrode on the substrate;
   wherein the first touch electrode, the plurality of main body portions and the first electrode are disposed in a same layer; or the first touch electrode, the plurality of main body portions and the isolation structure layer are disposed in a same layer.

2. The touch display panel according to claim 1, wherein a shape of an orthographic projection of the touch electrode on the substrate is a mesh defined with a plurality of grids, and each grid surrounds an orthographic projection of at least one of the light-emitting devices on the substrate.

3. The touch display panel according to claim 2, wherein each grid surrounds orthographic projections of a plurality of light-emitting devices on the substrate, and the plurality of light-emitting devices surrounded by a same grid constitute a repeat unit of pixel arrangement.

4. The touch display panel according to claim 2, wherein the light-emitting devices surrounded by each grid comprise a red light-emitting device, a green light-emitting device, and a blue light-emitting device.

5. The touch display panel according to claim 4, wherein the bridge portion comprises at least one wire, and the main body portions are sequentially arranged in a first direction parallel to the substrate, and the wire extends in the first direction.

6. The touch display panel according to claim 5, wherein the at least one wire comprises a plurality of wires, the plurality of wires are sequentially arranged in a second direction parallel to the substrate, and the first direction intersects with the second direction.

7. The touch display panel according to claim 5, wherein the first touch electrode extends in a second direction parallel to the substrate, and the first direction intersects with the second direction.

8. The touch display panel according to claim 1, wherein the first touch electrode and the plurality of main body portions are disposed in a same layer as the first electrode, and the bridge portion and the isolation structure layer are disposed in a same layer; and
   a shape of the first touch electrode and a shape of the plurality of main body portions are mesh defined with a plurality of grids, and each grid surrounds at least one of the first electrodes.

9. The touch display panel according to claim 8, wherein a part of the isolation structure layer comprises at least one strip-shaped through hole, and one of the bridge portions is located in the strip-shaped through hole and spaced apart from the isolation structure layer; and the touch display panel further comprises an insulating portion filled in an interval area between the isolation structure layer and the bridge portion.

10. The touch display panel according to claim 8, further comprising a pixel defining layer, located on a side, facing the substrate, of the isolation structure layer, wherein an orthographic projection of the isolation structure layer on the substrate is within a range of an orthographic projection of the pixel defining layer on the substrate; a plurality of pixel openings are formed in the pixel defining layer and the light-emitting devices are further located in the pixel openings; and the bridge portion is in contact with one of the main body portions by a through hole penetrating through the pixel defining layer.

11. The touch display panel according to claim 1, wherein the first touch electrode and the plurality of main body portions are disposed in a same layer as the isolation structure layer, the bridge portion and the first electrode are disposed in a same layer, a part of the isolation structure layer comprises a plurality of grid-shaped through holes, and the first touch electrode and the main body portion are located in the grid-shaped through hole and spaced apart from the isolation structure layer.

12. The touch display panel according to claim 11, further comprising an insulating portion, wherein
the insulating portion is filled between the isolation structure layer and the first touch electrode, and between the isolation structure layer and the main body portion.

13. The touch display panel according to claim 11, further comprising a pixel defining layer located on a side, facing the substrate, of the isolation structure layer, wherein an orthographic projection of the isolation structure layer on the substrate is within a range of an orthographic projection of the pixel defining layer on the substrate; a plurality of pixel openings are formed in the pixel defining layer, and the light-emitting devices are further located in the pixel openings; and one of the main body portions is in contact with the bridge portion by a through hole penetrating through the pixel defining layer.

14. The touch display panel according to claim 11, wherein the bridge portion is located between adjacent first electrodes.

15. The touch display panel according to claim 1, wherein the substrate comprises at least one conductive layer, and the bridge portion is located in any one of the conductive layers.

16. A display apparatus, comprising the touch display panel according to claim 1.

17. A manufacturing method for a touch display panel, comprising:
synchronously preparing a plurality of first electrodes, a first touch electrode and a plurality of main body portions on a substrate, wherein the first touch electrode and the main body portions are located between adjacent first electrodes;
preparing an isolation structure layer and a bridge portion on the substrate, wherein an orthographic projection of the isolation structure layer on the substrate covers an orthographic projection of the first touch electrode and orthographic projections of the plurality of main body portions on the substrate respectively, a plurality of isolation openings are formed in the isolation structure layer, and one of the isolation openings exposes at least a part of the first electrode; a part of the isolation structure layer comprises a through hole, the bridge portion is located in the through hole and spaced apart from the isolation structure layer, two ends of the bridge portion are electrically connected to adjacent one of the main body portions respectively, and an orthographic projection of the bridge portion on the substrate intersects with the orthographic projection of the first touch electrode on the substrate; and
sequentially preparing a light-emitting layer and a second electrode in the isolation opening to obtain the touch display panel.

18. The manufacturing method for the touch display panel according to claim 17, further comprising:
preparing an organic encapsulation layer on a side, facing away from the substrate, of the second electrode, wherein the organic encapsulation layer fills an interval area between the isolation structure layer and the bridge portion, and an orthographic projection of the organic encapsulation layer on the substrate covers orthographic projections of the second electrode, the isolation structure layer, and the bridge portion on the substrate.

19. A manufacturing method for a touch display panel, comprising:
synchronously preparing a plurality of first electrodes and a bridge portion on a substrate, wherein the bridge portion is located between adjacent first electrodes;
preparing an isolation structure layer, a first touch electrode and a plurality of main body portions on the substrate, wherein an orthographic projection of the isolation structure layer on the substrate covers an orthographic projection of the bridge portion on the substrate, a plurality of isolation openings are formed in the isolation structure layer, and the isolation opening exposes at least a part of the first electrode; a part of the isolation structure layer comprises a through hole, the first touch electrode and the main body portions are located in the through hole and spaced apart from the isolation structure layer, two ends of the bridge portion are electrically connected to adjacent one of the main body portions respectively, and the orthographic projection of the bridge portion on the substrate intersects with an orthographic projection of the first touch electrode on the substrate; and
sequentially preparing a light-emitting layer and a second electrode in the isolation opening to obtain the touch display panel.

20. The manufacturing method for the touch display panel according to claim 19, further comprising:
preparing an organic encapsulation layer on a side, facing away from the substrate, of the second electrode, wherein the organic encapsulation layer fills an interval area between the isolation structure layer and the main body portion, and an interval area between the isolation structure layer and the first touch electrode, and an orthographic projection of the organic encapsulation layer on the substrate covers orthographic projections of the second electrode, the isolation structure layer, the first touch electrode, and the main body portions on the substrate.

* * * * *